Dec. 22, 1953     T. R. MACKAY ET AL     2,663,599
LINE SHAFT GUIDE BEARING
Filed May 18, 1950     2 Sheets-Sheet 1

INVENTORS.
THOMAS R. MACKAY
PERRY L. ANGEL
BY
ATTORNEY.

Dec. 22, 1953    T. R. MACKAY ET AL    2,663,599
LINE SHAFT GUIDE BEARING
Filed May 18, 1950    2 Sheets-Sheet 2

INVENTORS.
THOMAS R. MACKAY
PERRY L. ANGEL
BY: *Paul L. Kohw*
ATTORNEY.

Patented Dec. 22, 1953

2,663,599

UNITED STATES PATENT OFFICE 2,663,599

LINE SHAFT GUIDE BEARING

Thomas R. Mackay, Pomona, and Perry L. Angel, La Verne, Calif., assignors to Fairbanks, Morse & Co., Chicago, Ill., a corporation of Illinois Application May 18, 1950, Serial No. 162,722

9 Claims. (Cl. 308—134.1)

This invention relates to improvements in water lubricated guide bearings for line shafts of deep well turbine pump assemblies and the like, and more particularly to a guide bearing characterized by an improved construction serving to minimize bearing wear consequent to sand or other abrasive matter, and to improve bearing lubrication and the life and efficiency of the bearing.

In general, the present invention is directed to the provision of an improved guide bearing for turbine pump line shafts, wherein the bearing is comprised of a bearing support suitably carried by the pump column pipe and supporting a sleeve bearing of resilient material, arranged in floating relation to the line shaft and the bearing support. The sleeve bearing is grooved or channeled in both its interior and exterior surfaces, while the bearing support includes a chamber receiving the sleeve bearing therein, and having in the wall of the chamber, a plurality of relatively staggered port openings to expose external surface portions of the sleeve bearing and the grooves therein, directly to the water in the pump column pipe, for promoting positive flushing of the bearing.

Objectively stated, the arrangement as generally described above, is such as to facilitate a thorough, rapid and continuous flushing of sand and abrasive matter from the bearing surfaces in the guide bearing, and further, to facilitate a thorough water lubrication of all such bearing surfaces.

Another object of the invention is to provide a guide bearing assembly of the character aforesaid, in which the grooves in the internal and external surfaces of the sleeve bearing extend spirally about the bearing over the length thereof, and are open to the ends of the sleeve bearing, whereby to promote positive water circulation through the bearing for effective bearing lubrication and abrasive flushing.

Other objects and advantages of the present improvements will appear from the following description of a presently preferred embodiment of the improved guide bearing as such is illustrated in the accompanying drawing wherein.

Figure 1:
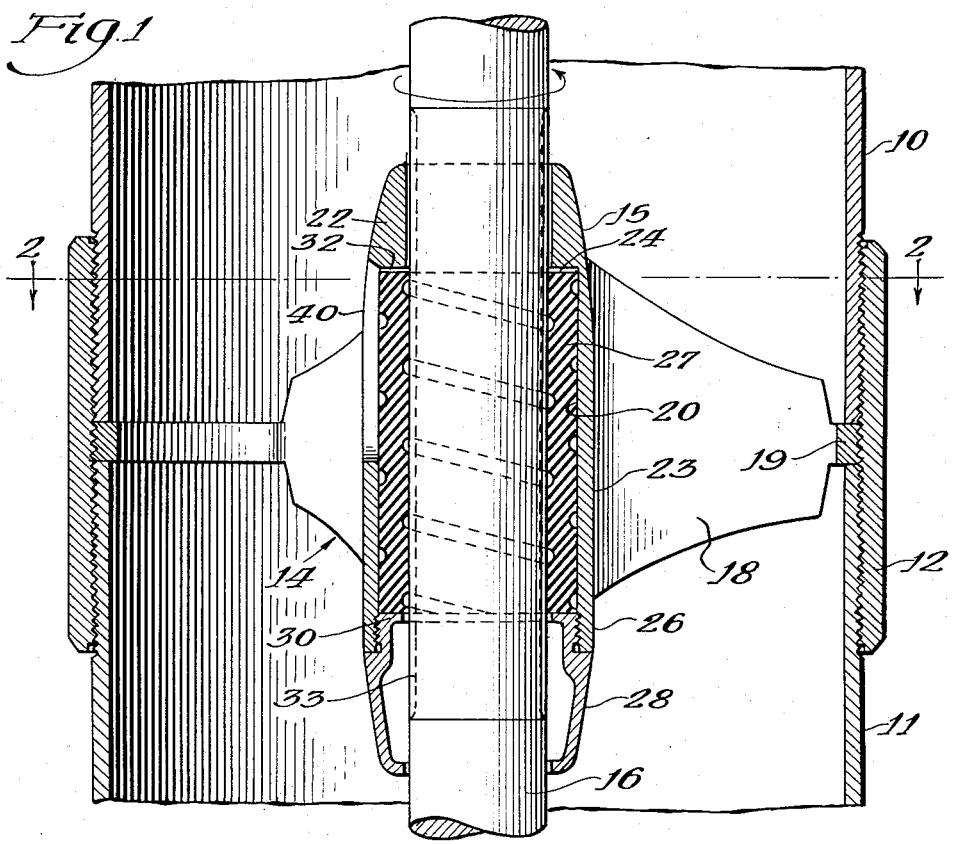
Fig. 1 is a fragmentary vertical section through a pump column pipe and line shaft assembly taken in the region of the guide bearing, illustrating features of the presently improved guide bearing.
Figure 3:
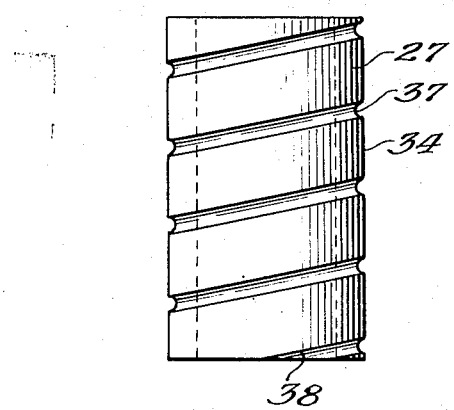
Fig. 3 is a view in side elevation, of the resilient sleeve bearing employed in the present bearing assembly.
Figure 4:
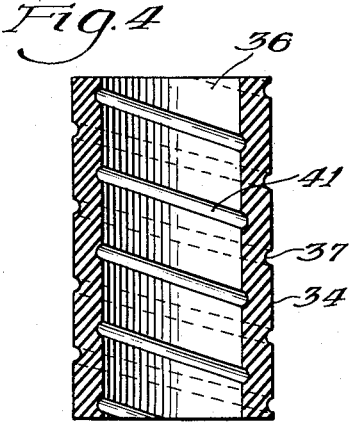
Fig. 4 is a longitudinal sectional elevation of the sleeve bearing.

Referring to the drawing by suitable characters of reference, 10 and 11 indicate sections of a pump column pipe which are suitably connected by a threaded collar 12. Within the pump column pipe is a bearing support structure indicated generally at 14, providing a generally tubular body portion 15 centrally of the pump column pipe and through which the pump line shaft 16 extends. Body 15 is carried by and fixed to the pump column pipe through arms 18 extending radially from the body 15 and joined at their free ends by an annular ring 19, the ring 19 being adapted for clamped seating between the adjacent ends of the coupled pump column pipe sections 10 and 11. If desired, the ring 19 may be threaded on its external periphery for threaded engagement with the collar 12, as shown.

The bearing body portion 15 of tubular form, provides a cylindrical chamber 20 therein, below the upper end section 22 of the body, the chamber wall 23 cooperating with the line shaft 16 in its extension through the bearing support, to form an annular pocket 24 between the shaft and wall 23, which is open at the lower end 26 of wall 23. Received in the pocket 24 is a tubular or sleeve bearing member 27 formed of suitable resilient material such as rubber. With the sleeve bearing in position in the pocket 24, the open end of the latter is closed by a closure member 28 of cap-like form, having a shoulder 30 in internal threaded attachment to the lower end 26 of the wall 23. When the cap 28 is drawn up, the shoulder 30 thereof serves in cooperation with the shoulder 32 formed by the upper end section 22 of the bearing support, to confine the sleeve bearing 27 to a limited vertical displacement or play in the pocket. Moreover, the sleeve bearing 27 is provided in such dimensions as to have a relatively close sleeve fit on the line shaft 16 over the wear resistant bearing surface portion 33 of the latter, and to have the outer surface 34 of the sleeve bearing closely adjacent to, but free of any binding engagement with, the inner surface of the chamber wall 23. In such arrangement, the sleeve bearing 27 is capable of rotation relative to the line shaft as well as to the chamber wall 23, so that it is thus capable of floating operation in the bearing support. However, in normal operation the sleeve bearing will tend to follow the rotary movement of the line shaft.

In operation of the pump assembly, the guide bearing is submerged in the column of water flowing upwardly in the pump column pipe, and since the bearing support structure 14 affords a running clearance with respect to the line shaft extending therethrough, water will pass to the interior of the bearing support and about the bearing sleeve 27 therein. Such circulation thus affords water lubrication of the bearing surfaces between the shaft 16 and the internal bearing surface 36 of the sleeve bearing 27, and also between the external surface 34 of the latter and the internal surface of the wall 23.

Figure 5:
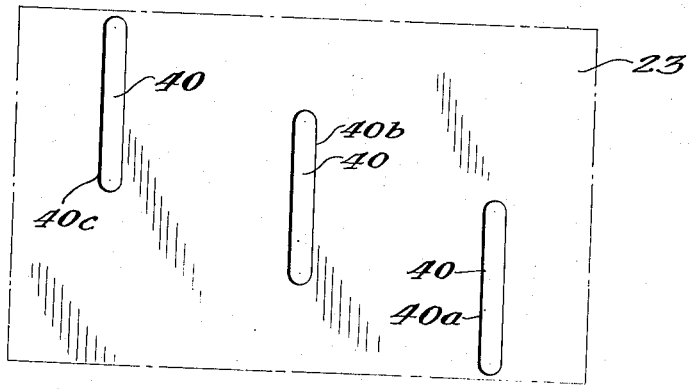
Fig. 5 is a developed view of the bearing support chamber wall portion having the indicated series of ports therein.

One of the major difficulties encountered in the maintenance of line shaft guide bearings in pump column pipes, is the more or less rapid wear of the bearing parts due to sand and other abrasive material entrained in the column of water flowing upwardly through the pump column pipe and in and about the guide bearing. Having that difficulty in mind, it is the major purpose of the presently improved guide bearing arrangement to reduce to a minimum such abrasive wear of the bearing, by affording a positive and continuous flushing circulation of water over the several bearing surfaces in the guide bearing. To this end the external or outer surface 34 of the sleeve bearing 27 is provided with a channel or groove 37 circumferentially thereof, the groove 37 in the present embodiment being provided as a continuous groove extending spirally about the sleeve bearing from end to end thereof, with the groove opening to each end as indicated at 38 with respect to the lower end of the sleeve bearing. Cooperating with the groove 37 in the sleeve bearing, are a plurality of vertically elongate openings or ports 40 provided in the chamber wall 23. The ports 40 are by preference, angularly spaced equally about the wall 23, and are arranged further in the relative staggered relation as shown in the developed view of the wall 23 appearing in Fig. 5. The lengths of the ports 40 and their staggered relationship are such that each overlaps in the vertical direction, the next adjacent port. More particularly, the upper portion of the lowermost port 40a overlaps the lower portion of intermediate port 40b, while the upper portion of port 40b overlaps the lower portion of the uppermost port 40c. Since the vertical extent of the portion of wall 23 between the bottom end of port 40a and the upper end of port 40c is equal to the length of the chamber 20, the ports 40 through their staggered relationship thus span slightly more than the length of the sleeve bearing.

Figure 2:
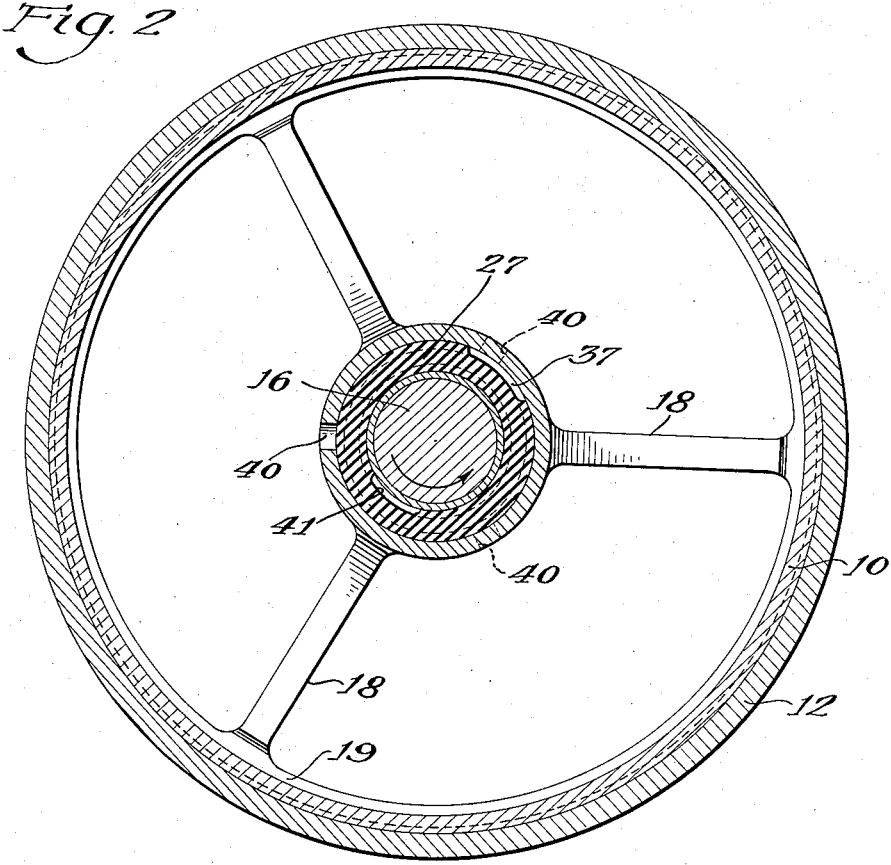
Fig. 2 is a transverse section as viewed from the line 2—2 in Fig. 1.

With the foregoing described arrangement of the groove 37 in sleeve bearing 27 and the ports 40 in wall 23, it will appear that circulation of water will occur through the ports 40 and along the groove 37. Hence, sand or gritty material entering between the surface 34 of the sleeve bearing and the internal surface of wall 23, will be flushed into the groove 37 and be discharged through one or another of the ports 40 as the bearing sleeve rotates, or should any abrasive particle tend to stick on the sleeve bearing surface, such particle will be brought into registry with one or another of the ports 40 and flushed therethrough to the exterior of the bearing. Also, some of the sand or gritty material entering the groove 37, may pass downwardly in the groove and be discharged at the lower open end thereof. To facilitate the last mentioned action, the direction of the spiral groove 37 is predetermined with regard to the normal or intended direction of line shaft rotation indicated by the arrow in Figs. 1 and 2, such that in sleeve bearing rotation the groove 37 in passing a given vertical reference line, will appear to have a downward displacement, thus aiding gravity displacement of the sand downwardly in the groove.

A similar spiral groove 41 is provided in the interior surface 36 of the bearing sleeve 27, to function in a similar manner in the removal or flushing of any gritty matter or sand entering between the sleeve bearing and the line shaft. Here again, the direction of the spiral groove 41 is determined with regard to the normal direction of shaft rotation such that the spiral groove will appear to move downwardly, hence facilitating passage of sand particles downwardly in the groove to discharge at the lower open end thereof.

Since the sleeve bearing normally tends to follow the rotation of the line shaft in bearing operation, it is to be observed that in consequence of the spiral groove 37 and the ports 40 in the arrangement shown and hereinabove described, particles of sand or abrasive matter entering the groove anywhere therealong, will be brought opposite one or another of the ports in materially less than a full revolution of the sleeve bearing. Thus, the present arrangement affords rapid flushing out of sand particles and other abrasive matter. Moreover, rapid flushing of abrasive particles tending to stick on the surface of the sleeve bearing, occurs in like manner. While in normal bearing operation, the sleeve bearing 27 follows line shaft rotation normally at somewhat less than one half the speed of the shaft because of the greater area of frictional contact between the external surface of the bearing sleeve and the wall 23, certain temporary or transient conditions of the sleeve bearing may obtain. In one extreme condition, the sleeve bearing may be held against rotation by sand lodging between the bearing and the wall 23. In such instance, the velocity of water passing upwardly along the shaft and through the grooves 41 will be substantially unimpeded and in fact, somewhat increased as a result of the pumping action consequent to line shaft rotation and the herein described directioning of the spiral groove 41. On the other hand, the velocity of water flow in and through the external grooves 37 will tend to be erratic both in magnitude and direction of water flow because of the tortuous paths around the ends of the external grooves and through the slots 40 in the support wall 23. Such velocity flow normally will be less than the velocity of the water flow in the column pipe, so that sand and other abrasive material will tend to pass downwardly in the grooves 37 and be washed away in the turbulent eddies at the slots 40.

Another extreme condition is that in which the sleeve bearing revolves at the speed of the line shaft, which may be due to sand lodging between the sleeve bearing and the shaft. Under this condition, sand particles will tend to drop downwardly in the sleeve bearing groove 37 because of the pumping action of the rotating sleeve bearing and further, because the velocity of water flow upwardly in this groove is less than that of the water flow in the pipe column. Because of the indicated direction of the spiral groove 37, the pumping action is downward, hence facilitating downward discharge of sand particles and the like.

The normal action of the bearing is somewhat between the two extremes above indicated, with the sand flushing action as herein above described facilitated to a more or less degree according to the relative speed of rotation of the shaft and the sleeve bearing.

It will appear now that the presently improved guide bearing affords a resilient sleeve bearing mounted in floating relation to its support and to the line shaft, but normally following in greater or less degree the rotation of the shaft, and provides further, an effective arrangement of ports in the sleeve bearing support and grooves or channels in the inner and outer surfaces of the sleeve bearing, for establishing positive circulation of water through the bearing. The positive circulation moreover, is such as continuously to flush the bearing surfaces of sand and abrasive matter, and to provide a fully adequate water lubrication of all bearing surfaces in the bearing assembly. In addition to the foregoing major features of the bearing, it is to be noted here that the closure element 28 in threaded engagement with the wall 23 of the bearing support, permits upon removal thereof, ready access to the sleeve bearing as for removal and replacement of the latter in the event after long use, such sleeve bearing becomes unduly worn.

Having now described and illustrated a presently preferred embodiment of our invention, what we desire to claim and secure by Letters Patent is:

1. In a pumping installation wherein liquid is forced through a pump column pipe in which a rotatable pump shaft is disposed, a guide bearing for the pump shaft comprising an elongated support member having a central, generally axially extending chamber through which the shaft extends, and a cylindrical bearing in said chamber disposed around said shaft for frictional drive thereby, the wall of said support member having openings therethrough spaced axially along the entire length of said chamber permitting the liquid being pumped to impinge on the entire outer surface of said bearing as said bearing is rotated, whereby dirt or the like may be flushed off the bearing.

2. In a pumping installation wherein liquid is forced through a pump column pipe in which a rotatable pump shaft is disposed, a guide bearing for the pump shaft comprising an elongated support member having a central, generally axially extending chamber through which the shaft extends, a cylindrical bearing in said chamber disposed around said shaft for frictional drive thereby, the wall of said support member having openings therethrough spaced axially along the entire length of said chamber permitting the liquid being pumped to impinge on the entire outer surface of said bearing as said bearing is rotated, and pumping means on the outer surface of said bearing effective to move liquid and entrained dirt or the like axially along said bearing until it is opposite one of said axially spaced openings to facilitate flushing of the dirt off said bearing.

3. In a pumping installation wherein liquid is forced through a pump column pipe in which a rotatable pump shaft is disposed, a guide bearing for the pump shaft comprising an elongated support member having a central, generally axially extending chamber through which the shaft extends, a cylindrical bearing in said chamber disposed around said shaft for frictional drive thereby, the wall of said support member having openings therethrough spaced axially along the entire length of said chamber permitting the liquid being pumped to impinge on the entire outer surface of said bearing as said bearing is rotated, and pumping means on the outer surface of said bearing effective to move liquid and entrained dirt or the like axially along said bearing in a direction opposite to the direction of flow of liquid being pumped toward and opposite one of said axially spaced openings to facilitate flushing of the dirt off said bearing.

4. A guide bearing for a vertical pump shaft, comprising a sleeve bearing on the shaft, a bearing support providing a chamber receiving said sleeve bearing for rotation therein, said sleeve bearing having a groove in its outer surface, extending generally spirally about the bearing, and said bearing support having relatively spaced, elongated ports providing openings along the entire length of the wall of the chamber, the sleeve bearing in rotation serving to displace said groove past said openings in the chamber whereby dirt or the like carried in said groove will be expelled through said ports.

5. A guide bearing for a vertical pump shaft, comprising a sleeve bearing on the shaft, a bearing support providing a chamber receiving said sleeve bearing for rotation therein, said sleeve bearing having a groove in its outer surface, extending generally spirally about the bearing, and said bearing support having relatively spaced ports providing openings along the entire length of the wall of the chamber, the sleeve bearing in rotation serving to displace said groove past said openings in the chamber whereby dirt or the like carried in said groove will be expelled through said ports, said ports being spaced circumferentially of said support and relatively overlapped to expose certain portions of said sleeve through more than one of said ports.

6. A guide bearing for a vertical pump shaft, comprising a sleeve bearing on the shaft, a bearing support providing a chamber receiving said sleeve bearing for rotation therein, said sleeve bearing having a groove in its outer surface, extending generally spirally about the bearing, and said bearing support having relatively spaced ports providing openings along the entire length of the wall of the chamber, the sleeve bearing in rotation serving to displace said groove past said openings in the chamber whereby dirt or the like carried in said groove will be expelled through said ports, said sleeve bearing having a second groove in its inner surface extending generally spirally around the sleeve.

7. A shaft guide bearing immersed in a body of fluid, comprising a sleeve mounted on the shaft, a support providing a chamber receiving said sleeve for rotation therein, said sleeve having a groove in its outer surface extending spirally of the sleeve along its length, said groove moving said fluid lengthwise of the sleeve when said sleeve is rotated, and said support having at least one opening through the wall of the chamber intermediate its ends, the fluid moved lengthwise of the sleeve being discharged through said opening.

8. A shaft guide bearing immersed in a body of fluid, comprising a sleeve mounted on the shaft, a support providing a chamber receiving said sleeve for rotation therein, said chamber having its ends in communication with said body of fluid, said sleeve having a groove in its outer surface extending spirally of the sleeve along its length, said groove moving said fluid lengthwise of the sleeve when said sleeve is rotated, and said support having at least one opening through the wall of the chamber intermediate its ends, the fluid moved lengthwise of the sleeve being discharged through said opening and at one end of the sleeve.

9. A shaft guide bearing immersed in a body of fluid, comprising a sleeve mounted on the shaft, a support providing a chamber receiving said sleeve for rotation therein, said chamber having its ends in communication with said body of fluid, said sleeve having a first groove in its outer surface and having a second groove in its inner surface both extending spirally of the sleeve along its length, said grooves moving said fluid lengthwise of the sleeve when said sleeve is rotated, and said support having at least one opening through the wall of the chamber intermediate its ends, the fluid moved lengthwise of the sleeve by said first groove being discharged through said opening and at one end of the sleeve and the fluid moved lengthwise of the sleeve by said second groove being discharged at an end of the sleeve.

THOMAS R. MACKAY.
PERRY L. ANGEL.

References Cited in the file of this patent

UNITED STATES PATENTS

| Number | Name | Date |
|---|---|---|
| 1,557,767 | Oliver | Oct. 20, 1925 |
| 1,674,453 | Sloper | June 19, 1928 |
| 2,106,860 | Tibbetts | Feb. 1, 1938 |
| 2,397,124 | Buffington | Mar. 26, 1946 |